Nov. 7, 1933.         M. J. HELPER         1,934,464
AEROPLANE FLYING TEACHING APPARATUS
Original Filed Aug. 27, 1930    2 Sheets-Sheet 1

Inventor
M. J. Helper
By
Attorneys

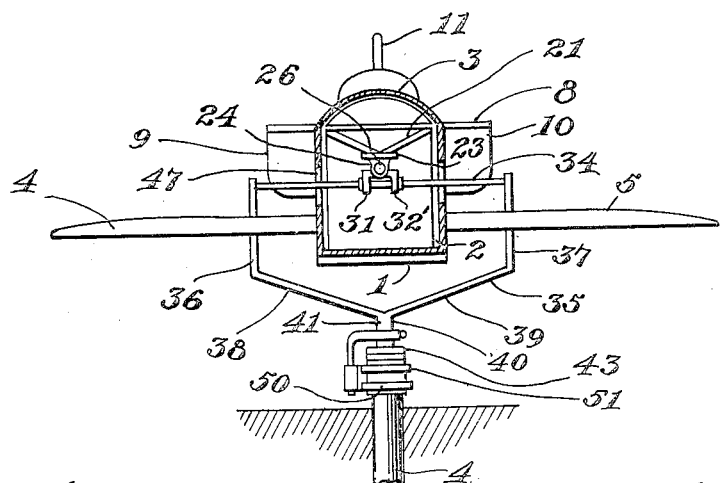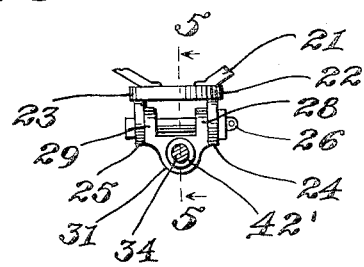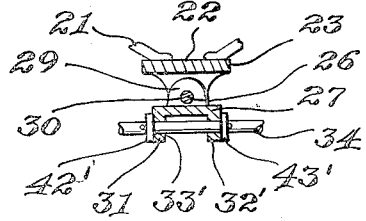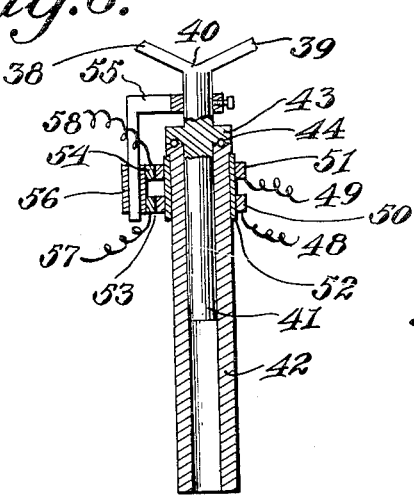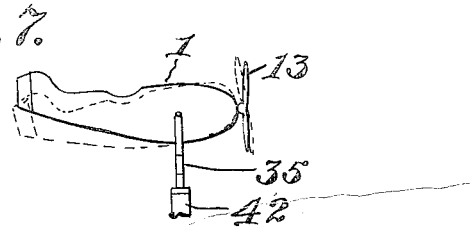

Patented Nov. 7, 1933

1,934,464

UNITED STATES PATENT OFFICE 1,934,464

AEROPLANE FLYING TEACHING APPARATUS

Morton J. Helper, Shaker Heights, Ohio

Original application August 27, 1930, Serial No. 478,093. Divided and this application April 30, 1931. Serial No. 534,075

7 Claims. (Cl. 35—12)

This invention relates to aeroplanes, and more particularly to apparatus for teaching the flying of an aeroplane.

The principal object of the invention is to provide an aeroplane flying teaching apparatus which is so supported upon the ground that it will not rise therefrom but is free to move as in climbing, diving and banking in actual flying.

Another object of the invention is to provide an aeroplane flying instructing apparatus of the above character which is operated and controlled by a pupil seated therein and will respond to said control in a similar manner to an aeroplane in actual flight.

A further object of the invention is to provide an apparatus of said character which may be also used for amusement purposes.

The present application is a division of my copending application Ser. No. 478,093, filed August 27, 1930 and concerns more particularly such elements of construction which are described in said prior application for facilitating the simulation of actual aeroplane movements in a device of this character supported from the ground.

With the above and other objects in view, the invention will be hereinafter fully described as illustrated in the accompanying drawings, and the novel features thereof will be particularly pointed out in the appended claims.

In the several views of the drawings, similar characters of reference are used to denote corresponding sparts.

Figure 3 is a part sectional, part elevational view taken on a plane substantially indicated by the line 3—3 on Figure 1, with a part of the fuselage cut back from such plane, however, to somewhat more clearly illustrate the means supporting the aeroplane.

Fig. 4 is a side view, on an enlarged scale of the universal joint member.

Fig. 5 is a part sectional, part elevational view taken on a plane substantially indicated by the line 5—5 of Fig. 4.

Fig. 6 is a part sectional, part elevational view on an enlarged scale illustrating the depending rod of the yoke member supported in the upright pipe, and the contact means for conducting the electric supply current to the motor.

Fig. 7 illustrates the aeroplane in longitudinal elevation and in balanced position, and its position when its nose is tilted upwardly as in climbing.

Fig. 8 illustrates the aeroplane at a right angle to that in Fig. 7 and its position when banking.

Figure 1:
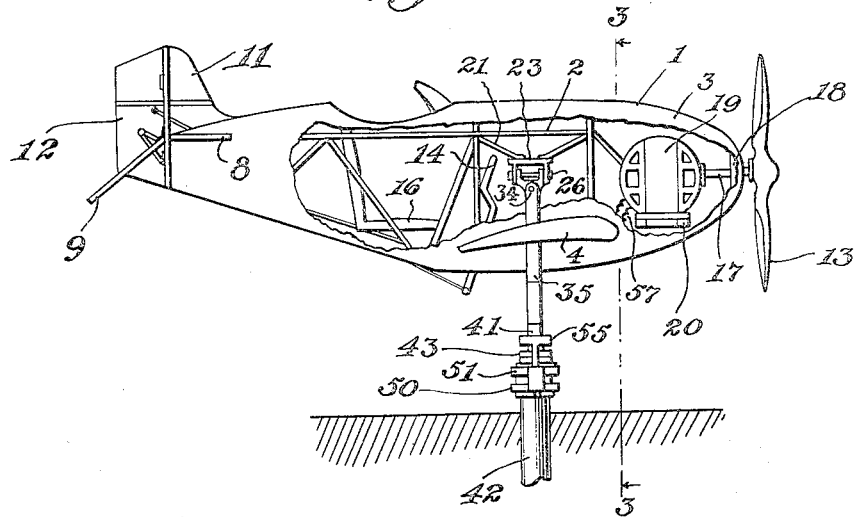
Fig. 1 is an illustration of an aeroplane constructed and supported in accordance with my invention.

Referring now to the drawings, 1 represents the fuselage of an aeroplane of ordinary construction consisting of the usual frame structure 2, covering 3, wings 4 and 5 with ailerons 6 and 7 therein, a horizontal stabilizer 8, flippers 9 and 10, a vertical fin 11 and a rudder 12, and a propeller 13. The ailerons and flippers are operated in the usual manner by means of the joystick 14 and said rudder by the rudder bar 15, to which said controlling devices are connected by cables in the usual manner as will be understood. A seat 16 is provided for the pupil. The propeller 13 is arranged at the forward or nose end of the fuselage and is fixed to the projecting end of the longitudinally extending shaft 17 which is supported in the bearing 18 carried by the frame structure 2. The propeller may be driven by a gas motor, as is ordinary practice, or other means, but an electric motor 19 for driving the shaft 17 is preferable and is employed. Said electric motor is supported within the fuselage by transverse bars 20 at the forward or nose end of the frame structure 2.

My invention consists in so supporting the aeroplane described upon the ground that it is capable of a practical simulation of all movements as in actual flight except rising from the ground or the movement forwardly, for the purpose of teaching the art of flying. In order to thus support the aeroplane, a plurality of arms, indicated by 21, depend from the frame structure 2, and fixed to the lower free ends thereof is the upper part 22 of a universal joint member. Said upper part 22 consists of a horizontal plate 23 having transversely extending forward and rear depending lugs 24 and 25 provided with aligning openings for supporting a longitudinally extending bolt or pin 26. The lower part of the universal joint member consists of a central plate 27 having formed integrally therewith transversely extending forward and rear upright lugs 28 and 29 provided with openings at 30 for receiving the bolt or pin 26, and depending longitudinally extending lugs 31 and 32 arranged at right angles to said upright lugs. The lugs 31 and 32 are provided with aligning transverse openings at 33 for rotatably receiving a cross shaft 34 of a yoke member 35 for supporting the aeroplane.

The yoke member 35 consists of a cross shaft 34 forming the top thereof, depending bars 36 and 37 forming the sides, inclined bars 38 and 39 extending from said side bars and having their inner ends fixed at 40 to a vertical column or post 41. Washers or flanges 42' and 43' on the cross shaft 34 retain said universal joint member and therefore the aeroplane in a central position thereon. The vertical post 41 is rotatably mounted in the upper end of a vertical cylindrical member 42, the lower end of which is sunk into the ground a sufficient distance for supporting the weight of the aeroplane and withstanding the strain of same when in operation. A collar 43 of the post 41 rests upon the upper end of the member 42, and ball bearings 44 are preferably provided at this joint. As the aeroplane should be substantially in normal balance when the pupil is in the seat 16, the universal joint is properly located in the position shown for accomplishing same and the depending bars 36 and 37 of the yoke member 35 pass through the ailerons 6 and 7. To permit free movement of the aeroplane relative to the yoke member 35, longitudinal slots 45 and 46 for the side bars 36 and 37 are provided in the ailerons 6 and 7, and vertical slots at 47 in the sides of the fuselage for the cross shaft 34.

Electric current is supplied to the motor 19 by means of wires 48 and 49 leading to contact rings 50 and 51, which are fixed to the member 42 but insulated therefrom at 52. Brushes 53 and 54 engage the contact rings 50 and 51, and are carried by a bracket arm 55 which is fixed to the vertical post 41 and rotates therewith. The brushes 53 and 54 are insulated at 56 from said bracket arm. Wires 57 and 58 extend from said brushes to the motor 19.

In practice, the pupil is in the seat 16 with his feet on the rudder bar 15 and having his hand on the joy stick 14. The electric motor 19 is switched on, thereby driving the propeller 13 and creating a current of air which is forced rearwardly causing the same effect upon the wings, ailerons, stabilizer, flippers, fin and rudder as in the actual travelling in the flying of an aeroplane. The pupil operates the joy stick and rudder bar according to verbal or other instructions, and the correspondingly operating ailerons, flippers and rudder will cause a certain performance of the aeroplane similar to that experienced in actual flight except that the aeroplane does not leave the ground. Thus the pupil will learn to properly operate the joy stick and rudder bar and thereby become accustomed to the feel thereof for controlling the aeroplane to do his will.

Figure 2:
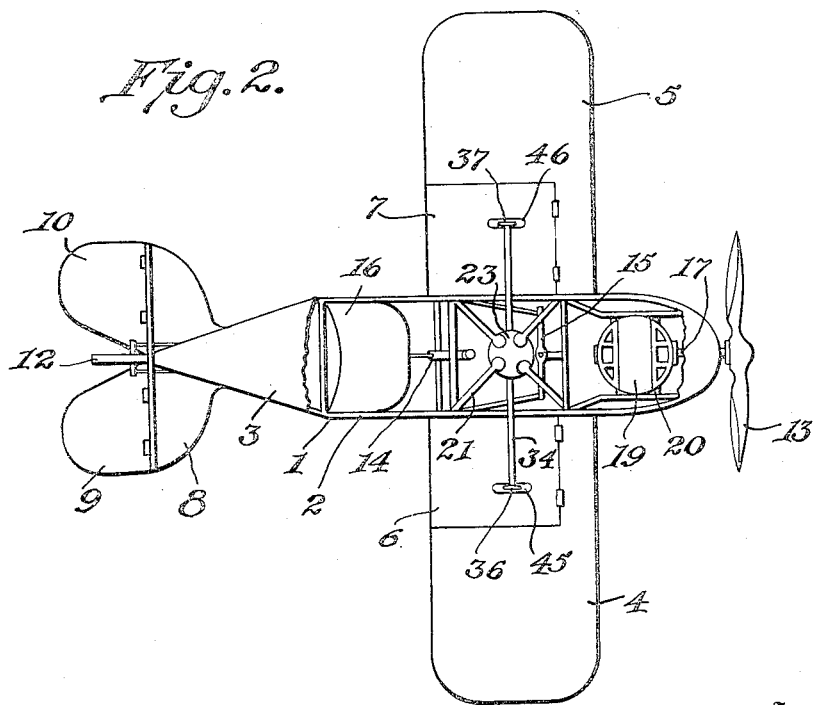
Fig. 2 is a plan view thereof.

It will be understood from the foregoing that I have provided a novel and improved flying instructing apparatus which may be safely manipulated by any inexperienced person, and that I employ an actual aeroplane propeller to effect the various climbing, diving, turning and banking movements. This propeller as described is mounted at the forward end of the aeroplane body or fuselage and the air currents generated therefrom pass rearwardly into contact with the ailerons, flippers and rudder, which upon manipulation by the controls at the command of the person within the aeroplane cause movements comparable to those encountered in actual flying. There is, however, one practical difference in the operation of my practice or instructing aeroplane and an actual aeroplane in flight, i. e., in the present device there, of course, are none of the air currents which develop from the forward speed of an actual aeroplane in flight. These air currents are very effective in such flight upon the various aeroplane control devices, particularly the ailerons, which are ordinarily carried at the outer extremities of the wings. In my apparatus, as has been mentioned, I depend solely upon the air currents generated by the propeller, which, due to its limited size, would not blow sufficient air to the outer portion or extremities of the wings and ordinary ailerons to have any effect thereon. The air currents generated by the propeller blow substantially in a straight line backwardly along the fuselage of the aeroplane, and I have accordingly revised the ordinary aileron construction to satisfactorily meet the conditions in the present apparatus. As is seen from the drawings, particularly Fig. 2, the ailerons 6 and 7 form sections of the wings closely adjacent the fuselage. By this improved change in construction I am enabled to obtain the same results in aeroplane movements caused by manipulation of the ailerons as in a regular aeroplane.

From the drawings and description, it is readily seen that this aeroplane flying instructing apparatus is capable of moving as in climbing, diving and banking in actual flight, and that said movements may be controlled by the pupil operating the joy stick and rudder bar for the purpose of teaching the art of flying.

Throughout this application, both in the description and claims, the word "aeroplane" has been used with the understanding that either a real aeroplane or a simulation thereof is meant.

Although the construction set forth is adapted for accomplishing the intended purpose, it will be understood that slight changes in the details of construction for supporting an aeroplane in accordance with the principles of this invention may be made within the scope of the claims.

Having fully described my invention, what I claim is:—

1. In an aeroplane flying instructing apparatus, the combination of an imitation aeroplane having a fuselage, wings, and ailerons forming sections of said wings, said ailerons being located at the inner ends of said wings closely adjacent the aeroplane fuselage, and a power driven propeller mounted on said aeroplane.

2. In an aeroplane flying instructing apparatus, the combination of an imitation aeroplane having a fuselage, wings, and ailerons forming sections of said wings, said ailerons being located at the inner ends of said wings closely adjacent the aeroplane fuselage, and a power driven propeller, and means for mounting said aeroplane at an elevated position for universal movements.

3. In an aeroplane flying instructing apparatus, the combination of an imitation aeroplane, a rod, the rod being supported from the ground, a frame, the frame being fixed to said rod, the frame having a cross shaft, a universal joint member, the universal joint member consisting of a lower and an upper part, the lower part being pivotally supported by said cross shaft, said upper part being pivoted to said lower part for movement at a right angle to the movement of said lower part upon said cross shaft, and said aeroplane being fixed to said upper part of said universal joint member.

4. In an aeroplane flying instructing apparatus, the combination of an imitation aeroplane, an upright rod, the rod being rotatably supported from the ground, said aeroplane being rotatably supported by said upright rod, the propeller of the aeroplane being at the nose end thereof, an electric motor for driving the propeller, contact rings, brushes carried by said upright rod engaging said contact rings, electric current supply wires leading to said contact rings, and wires extending from said brushes to said motor.

5. In an aeroplane flying instructing apparatus, the combination of an imitation aeroplane, the aeroplane having a frame structure, a universal joint member, the universal joint member consisting of an upper and a lower part, the frame structure of the aeroplane being fixed to the upper part of said universal joint member, said upper part being pivoted to said lower part to swing laterally, a frame, the frame having a cross shaft, the cross shaft extending beyond each side of said aeroplane, said lower part being pivotally mounted upon said cross shaft, an upright rod, said frame being fixed to said rod, and said rod being rotatably supported from the ground.

6. In an aeroplane flying instructing apparatus, the combination of an imitation aeroplane, the aeroplane having a propeller at its nose end, an electric motor carried by the aeroplane for driving said propeller, an upright rod, a pipe, the rod being rotatably supported in the pipe, a yoke member fixed to said rod, a universal joint member, the universal joint member being pivotally supported by said yoke member, said aeroplane being fixed to said universal joint member, and means carried by said pipe and rod whereby electric current may be supplied to said motor.

7. In an aeroplane flying instructing apparatus, the combination of an imitation aeroplane, the aeroplane having a propeller at its nose end, an electric motor carried by the aeroplane for driving said propeller, an upright rod, a pipe, the rod being rotatably supported in the pipe, a yoke member fixed to said rod, a universal joint member, the universal joint member being pivotally supported by said yoke member, said aeroplane being fixed to said universal joint member, contact rings carried by said pipe, an arm carried by said upright rod, brushes carried by said arm and adapted to engage said contact rings, wires leading from said brushes to said motor, and wires from an electric current supply to said contact rings.

MORTON J. HELPER.